(12) United States Patent
Sokuler et al.

(10) Patent No.: US 11,292,185 B2
(45) Date of Patent: Apr. 5, 2022

(54) METHOD AND SYSTEM FOR REDUCING CURLING IN ADDITIVE MANUFACTURING

(71) Applicant: Stratasys Ltd., Rehovot (IL)

(72) Inventors: Mordechay Sokuler, Zichron Yaacov (IL); Alexander Libinson, Holon (IL); Shmuel Rubin, Moshav Tkuma (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/254,314

(22) PCT Filed: Jun. 19, 2019

(86) PCT No.: PCT/IL2019/050685
§ 371 (c)(1),
(2) Date: Dec. 21, 2020

(87) PCT Pub. No.: WO2020/003301
PCT Pub. Date: Jan. 2, 2020

(65) Prior Publication Data
US 2021/0138719 A1 May 13, 2021

Related U.S. Application Data

(60) Provisional application No. 62/690,993, filed on Jun. 28, 2018.

(51) Int. Cl.
*B29C 64/40* (2017.01)
*B29C 64/295* (2017.01)
(Continued)

(52) U.S. Cl.
CPC .......... *B29C 64/112* (2017.08); *B29C 64/209* (2017.08); *B29C 64/295* (2017.08);
(Continued)

(58) Field of Classification Search
CPC ..... B29C 64/112; B29C 64/40; B29C 64/295; B29C 64/209; B29C 2948/92209; B33Y 10/00; B33Y 30/00; B33Y 70/00
See application file for complete search history.

(56) References Cited

U.S. PATENT DOCUMENTS

2002/0171177 A1* 11/2002 Kritchman ............. B33Y 10/00
264/401
2006/0054039 A1 3/2006 Kritchman et al.
(Continued)

FOREIGN PATENT DOCUMENTS

WO WO 2018/055521 3/2018
WO WO 2020/003301 1/2020

OTHER PUBLICATIONS

International Search Report and the Written Opinion dated Oct. 30, 2019 From the International Searching Authority Re. Application No. PCT/IL2019/050685. (18 Pages).
(Continued)

*Primary Examiner* — Joseph S Del Sole
*Assistant Examiner* — Baileigh Kate Darnell

(57) ABSTRACT

A method of additive manufacturing of a three-dimensional object, comprises: sequentially dispensing and solidifying layers to form on a surface a sacrificial structure. In embodiments the sacrificial structure comprises a bulk volume and heating cells embedded in the bulk volume, where the heating cells release more heat than the bulk volume upon the solidification of the layers. In embodiments, the sacrificial structure comprises pinning structures embedded in the bulk volume. The method also comprises sequentially dispensing and solidifying layers to form the three-dimensional object on a portion of the sacrificial structure.

20 Claims, 12 Drawing Sheets

(51) Int. Cl.
*B33Y 10/00* (2015.01)
*B29C 64/112* (2017.01)
*B29C 64/209* (2017.01)
*B33Y 30/00* (2015.01)
*B33Y 70/00* (2020.01)

(52) U.S. Cl.
CPC .... *B29C 64/40* (2017.08); *B29C 2948/92209* (2019.02); *B33Y 10/00* (2014.12); *B33Y 30/00* (2014.12); *B33Y 70/00* (2014.12)

(56) References Cited

U.S. PATENT DOCUMENTS

2010/0191360 A1* 7/2010 Napadensky ........... B29C 64/40
  700/98
2013/0040091 A1 2/2013 Dikovsky et al.

OTHER PUBLICATIONS

Invitation to Pay Additional Fees, Communication Relating to the Results of the Partial International Search and the Provisional Opinion dated Sep. 6, 2019 From the International Searching Authority Re. Application No. PCT/IL2019/050685. (13 Pages).
International Preliminary Report on Patentability dated Jan. 7, 2020 From the International Bureau of WIPO Re. Application No. PCT/IL2019/050685. (11 Pages).

* cited by examiner

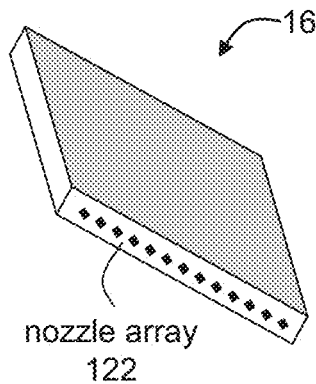
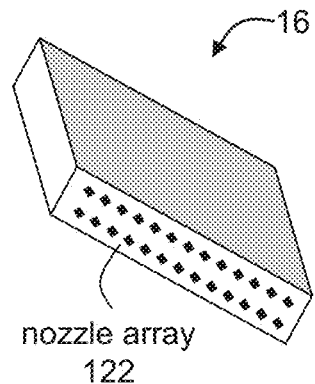
FIG. 2A   FIG. 2B
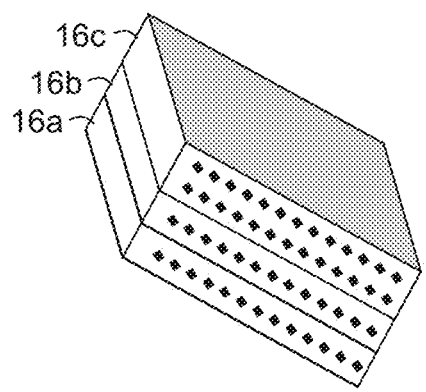
FIG. 2C

FIG. 3A
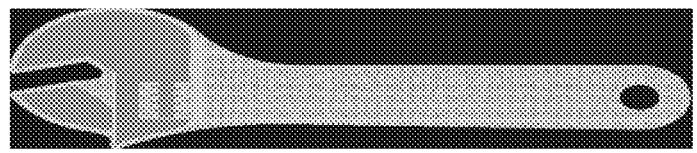
FIG. 3B
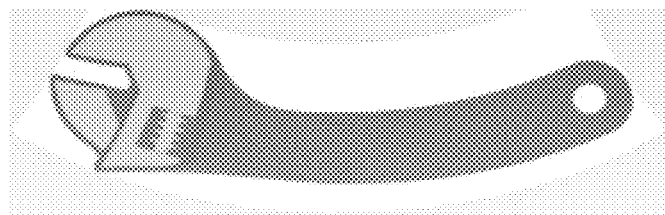
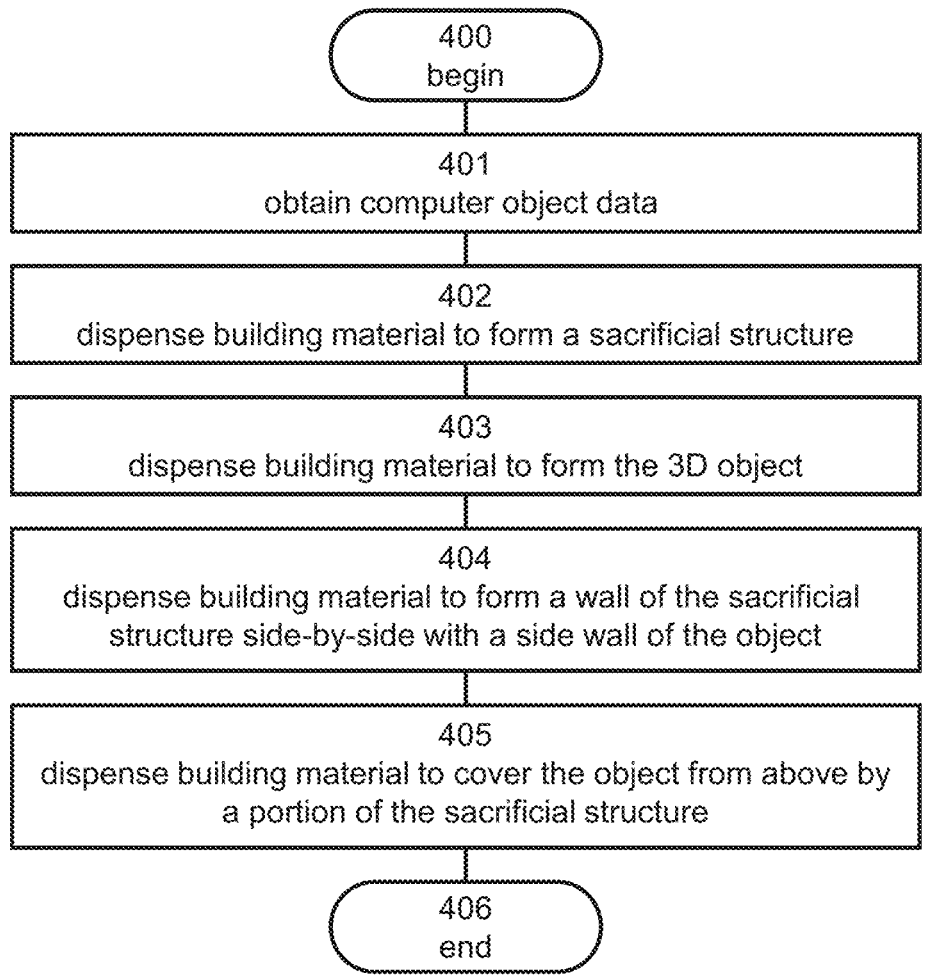
FIG. 4

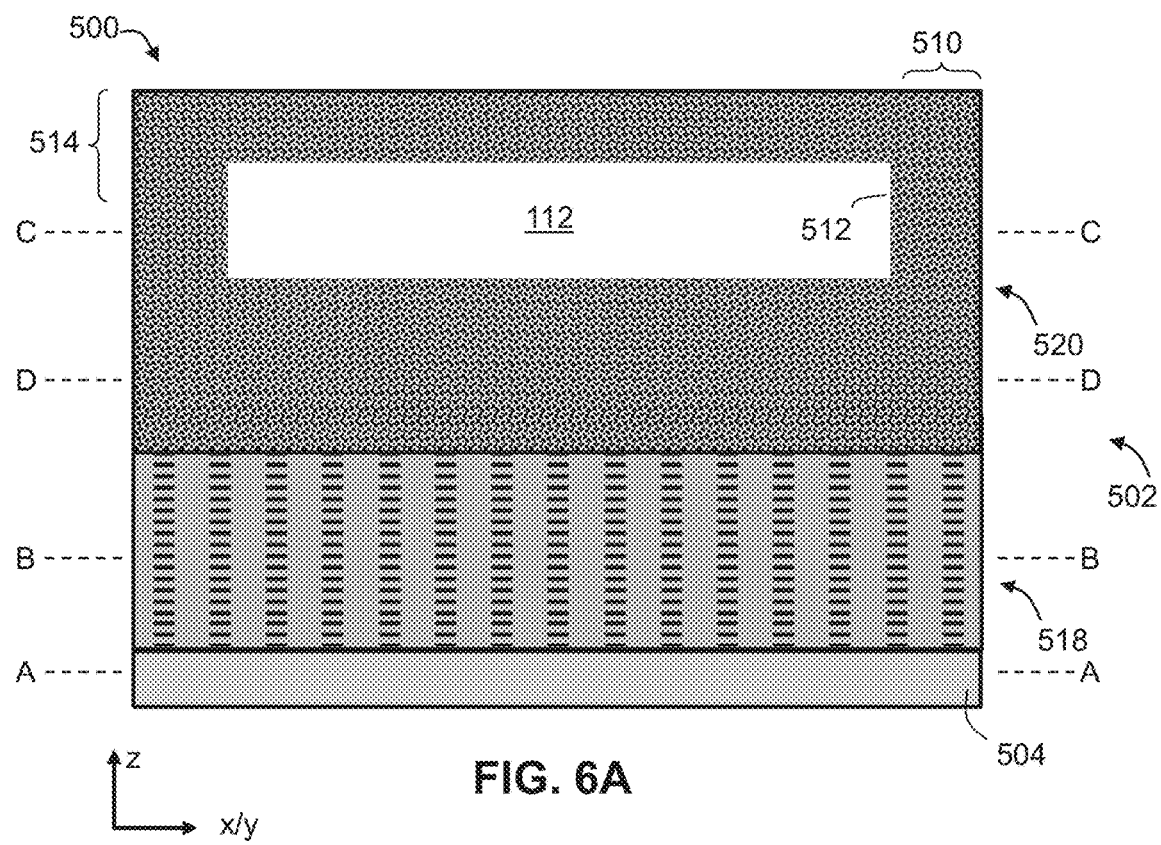
FIG. 6A
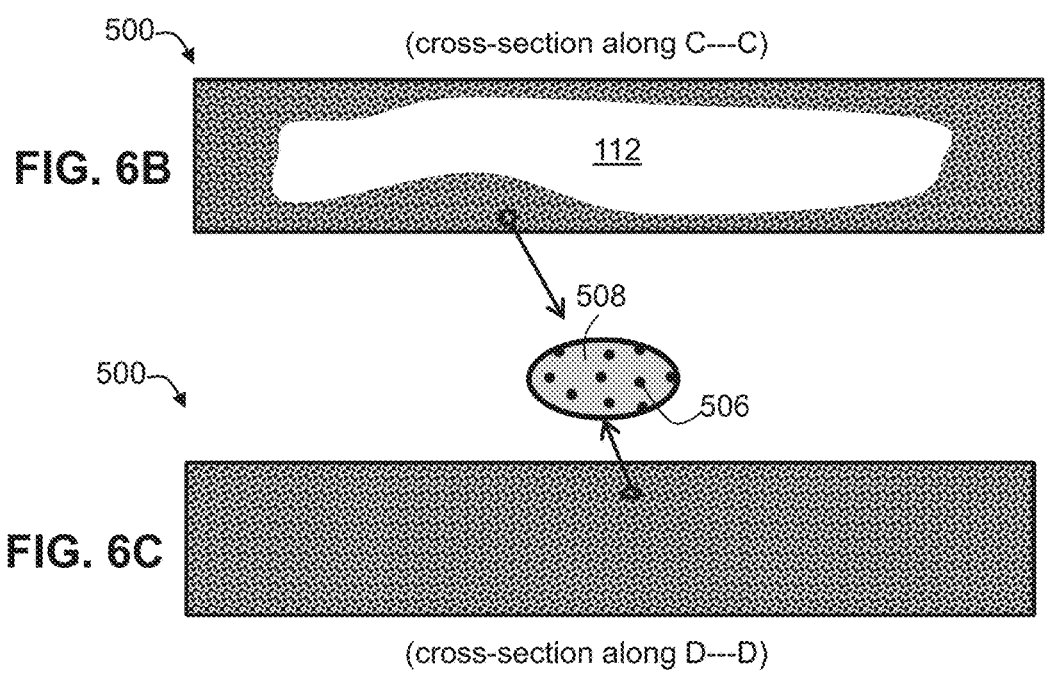
FIG. 6B (cross-section along C---C)
FIG. 6C (cross-section along D---D)

(cross-section along F---F)

METHOD AND SYSTEM FOR REDUCING CURLING IN ADDITIVE MANUFACTURING

RELATED APPLICATIONS

This application is a National Phase of PCT Patent Application No. PCT/IL2019/050685 having International filing date of Jun. 19, 2019, which claims the benefit of priority under 35 USC § 119(e) of U.S. Provisional Patent Application No. 62/690,993 filed on Jun. 28, 2018. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to a method and system for reducing curling in additive manufacturing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment, which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 9,031,680 and 9,227,365, U.S. Published Application No. 20060054039, and International publication No. WO2016/009426, all by the same Assignee, and being hereby incorporated by reference in their entirety.

Some building materials, particularly UV polymerizable materials, exhibit undesired deformation during additive manufacturing. One such deformation is the curling-up of the edges of the final manufactured object. Several solutions to the problem of curling have been proposed. For example, U.S. Pat. No. 9,227,365 discloses a technique in which the final object to be fabricated is designed as a core-shell structure, wherein a material that is used as the shell has different properties than the material that is used as the core.

International publication No. WO2016/009426 discloses a technique in which the curling effect of the final object is reduced or eliminated by setting a sufficiently prolonged time interval between the initiations of curing of successive layers.

U.S. Published Application No. 20060054039 discloses a technique in which a thin carpet of building material is provided below and/or around the base of the object being printed. The '039 disclosure explains that the carpet is effective for preventing air and radiation from infiltrating between the base of object and the working tray, thereby helping prevent detachment of the object from tray.

SUMMARY OF THE INVENTION

According to an aspect of some embodiments of the present invention there is provided a method of additive manufacturing of a three-dimensional object. The method comprises: sequentially dispensing and solidifying layers to form on a surface a sacrificial structure comprising a bulk volume and heating cells embedded in the bulk volume, wherein the heating cells are made of a modeling material that releases more heat than the bulk volume upon the solidification of the layers; and sequentially dispensing and solidifying layers to form the three-dimensional object on a portion of the sacrificial structure.

According to some embodiments of the invention the sacrificial structure also comprises pinning structures embedded in the bulk volume, the pinning structures being made of a building material that, once solidified, is harder than the bulk volume.

According to some embodiments of the invention the pinning structures are formed to support a periphery of the three-dimensional object from below.

According to some embodiments of the invention the pinning structures are formed to support a side wall of the three-dimensional object.

According to some embodiments of the invention the bulk volume comprises voxel elements containing a support material, and a modeling material at interlaced locations, wherein at least one voxel element contains a first modeling material having, immediately once solidified, a heat deflection temperature (HDT) of at least 50° C., and wherein at least one voxel element contains a second modeling material having, immediately once solidified, a HDT of less than 50° C.

According to some embodiments of the invention, the heating cells are embedded in the upper part but below the three-dimensional object.

According to some embodiments of the invention, the heating cells are made at least in part of the second modeling material.

According to some embodiments of the invention, the heating cells are devoid of the support material.

According to some embodiments of the invention, the heating cells are devoid of the first modeling material.

According to an aspect of some embodiments of the present invention there is provided a method of additive manufacturing of a three-dimensional object. The method comprises: sequentially dispensing and solidifying layers to form on a surface a sacrificial structure comprising a bulk volume and pinning structures embedded in the bulk volume, wherein the pinning structures are made of a building material that, once solidified, is harder than the bulk volume; and sequentially dispensing and solidifying layers to form the three-dimensional object on a portion of the sacrificial structure.

According to some embodiments of the invention, the pinning structures are shaped as poles.

According to some embodiments of the invention, the pinning structures are formed to support a periphery of the three-dimensional object from below.

According to some embodiments of the invention the pinning structures are formed to support a side wall of the three-dimensional object.

According to some embodiments of the invention the bulk volume comprises voxel elements containing a support material, and a modeling material at interlaced locations, wherein at least one voxel element contains a first modeling material having, immediately once solidified, a heat deflection temperature (HDT) of at least 50° C., and wherein at least one voxel element contains a second modeling material having, immediately once solidified, a HDT of less than 50° C.

According to some embodiments of the invention, the method comprises continuing forming the sacrificial structure during the dispensing and solidifying of the layers to form the three-dimensional object, so as to form a wall of the sacrificial structure side-by-side with a side wall of the three-dimensional object.

According to some embodiments of the invention the method comprises continuing forming the sacrificial structure during the dispensing and solidifying of the layers to form the three-dimensional object, so as to form a wall of the sacrificial structure side-by-side with a side wall of the three-dimensional object, wherein the wall containing a support material and a modeling material at interlaced locations, the modeling material having a heat deflection temperature (HDT) of less than 50° C.

According to an aspect of some embodiments of the present invention there is provided a method of additive manufacturing of a three-dimensional object. The method comprises: sequentially dispensing and solidifying layers to form on a surface a sacrificial structure comprising voxel elements containing a support material and a first modeling material at interlaced locations, wherein the first modeling material has, immediately once solidified, a heat deflection temperature (HDT) of at least 50° C.; sequentially dispensing and solidifying layers to form the three-dimensional object on a portion of the sacrificial structure.

According to some embodiments of the invention a ratio between a number of voxels containing the first modeling material and a number of voxels containing the support material is from about 1:1 to about 99:1. According to some embodiments of the invention the ratio is selected from the group consisting from about 1:5 to about 1:4.

According to some embodiments of the invention the method comprises: sequentially dispensing and solidifying layers to form on a surface an additional sacrificial structure comprising voxel elements containing a support material and a second modeling material at interlaced locations, wherein the first modeling material has, immediately once solidified, a heat deflection temperature (HDT) of less than 50° C. sequentially dispensing and solidifying layers to form the three-dimensional object on a portion of the sacrificial structure.

According to some embodiments of the invention a ratio between a number of voxels containing the second modeling material and a number of voxels containing the support material is from about 1:1 to about 99:1. According to some embodiments of the invention the ratio is selected from the group consisting from about 1:2 to about 1:1.

According to some embodiments of the invention, at least two layers of the sacrificial structure comprise voxel elements containing the support material and a second modeling material at interlaced locations, the second modeling material having, immediately once solidified, a HDT of less than 50° C.

According to some embodiments of the invention, the sacrificial structure comprises a lower part having voxel elements containing the support material and the first modeling material at interlaced locations, and also comprises an upper part having voxel elements containing the support material and the second modeling material at interlaced locations.

According to some embodiments of the invention a width of the wall of the sacrificial structure, as measured perpendicularly to a built direction of the layers, is at least 1.6 mm.

According to some embodiments of the invention the method comprises continuing forming the sacrificial structure following the dispensing and solidifying of the layers to form the three-dimensional object, so as to at least partially cover the three-dimensional object with the sacrificial structure from above.

According to an aspect of some embodiments of the present invention there is provided a system for fabricating a three-dimensional object by additive manufacturing. The system comprises: a plurality of dispensing heads, having at least a first dispensing head configured for dispensing a modeling material, and a second dispensing head configured for dispensing a support material; a solidification system configured for solidifying each of the materials; and a computerized controller having a circuit configured for operating the dispensing heads and solidification system so as to execute the method as delineated above and optionally and preferably as detailed below.

According to an aspect of some embodiments of the present invention there is provided a sacrificial structure for holding a three-dimensional object manufactured by additive manufacturing of, the sacrificial structure is layered and comprising a bulk volume and heating cells embedded in the bulk volume, wherein the bulk volume comprises voxel elements containing a support material, and wherein the heating cells are made of a modeling material, are devoid of the support material, and having a largest horizontal dimension of from about 1 mm to about 20 mm and a height of from about 0.06 mm to about 1 mm.

According to an aspect of some embodiments of the present invention there is provided a sacrificial structure for holding a three-dimensional object manufactured by additive manufacturing of, the sacrificial structure is layered and comprises a bulk volume and pinning structures embedded in the bulk volume, wherein the pinning structures are made of a building material that is harder than the bulk volume.

According to an aspect of some embodiments of the present invention there is provided a sacrificial structure for holding a three-dimensional object manufactured by additive manufacturing of, the sacrificial structure is layered and comprising voxel elements containing a support material and a first modeling material at interlaced locations, wherein the first modeling material has a heat deflection temperature (HDT) of at least 50° C.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-2C are schematic illustrations of printing heads according to some embodiments of the present invention;

FIGS. 3A and 3B are schematic illustrations demonstrating coordinate transformations according to some embodiments of the present invention;

FIG. 4 is a flowchart diagram of a method suitable for additive manufacturing of a three-dimensional object, according to various exemplary embodiments of the present invention;

FIGS. 6A-C are schematic illustrations of an embodiment in which a sacrificial structure comprises a lower part and an upper part;

DESCRIPTION OF SPECIFIC EMBODIMENTS OF THE INVENTION

Figure 1A:
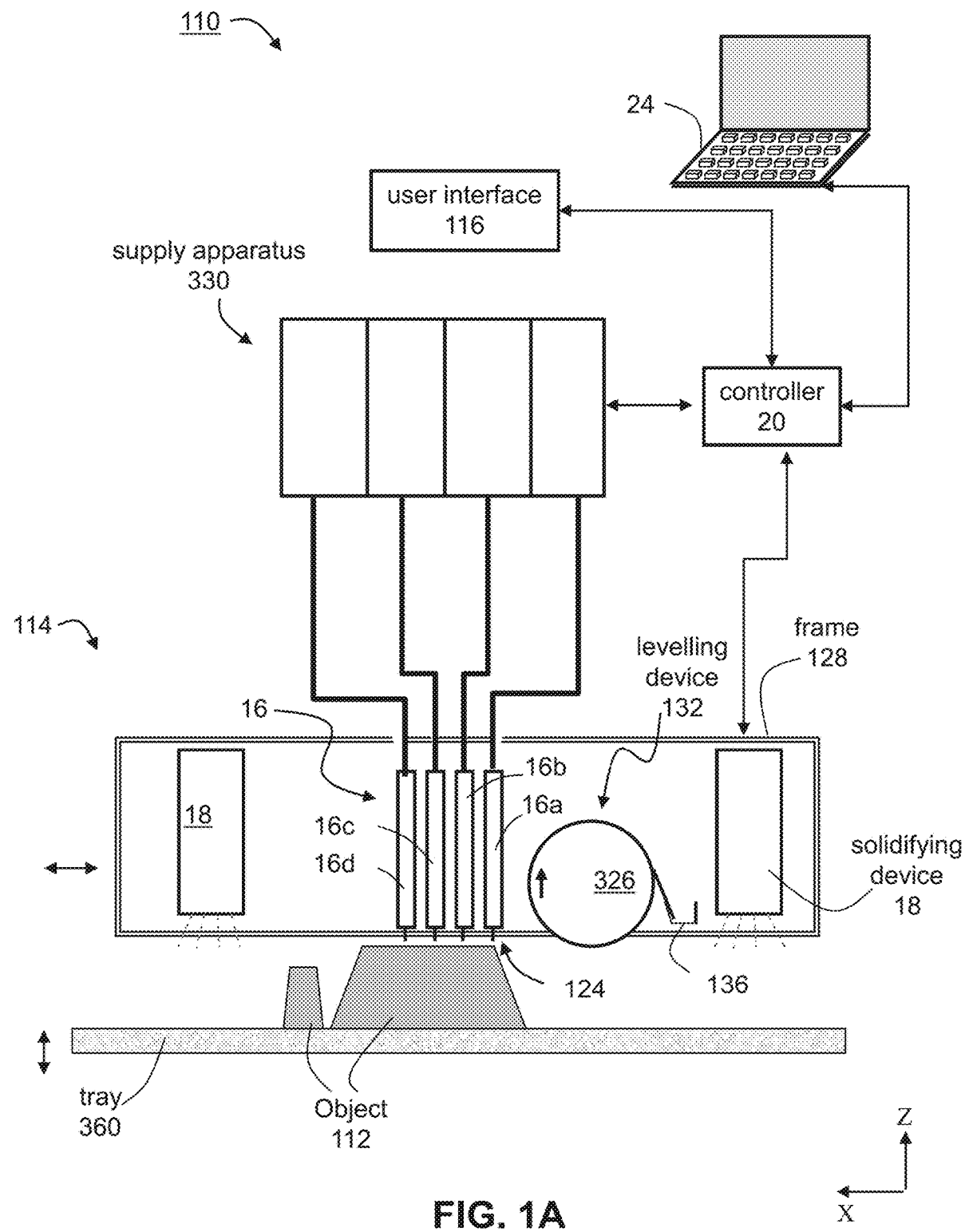
FIGS. 1A-D are schematic illustrations of an additive manufacturing system according to some embodiments of the invention.

The present invention, in some embodiments thereof, relates to additive manufacturing and, more particularly, but not exclusively, to a method and system for reducing curling in additive manufacturing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments, a building material formulation is dispensed from a dispensing head having a set of nozzles to deposit building material formulation in layers on a supporting structure. The AM apparatus thus dispenses building material formulation in target locations, which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves for building a matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention, an object is manufactured by dispensing two or more different modeling material formulations, each material formulation being dispensed from a different dispensing head or from a different channel of the dispensing head of the AM system. The material formulations are optionally and preferably deposited in layers during the same pass of the printing heads. The material formulations and combination of material formulations within the layer are selected according to the desired properties of the object.

A representative and non-limiting example of a system 110 suitable for AM of an object 112 according to some embodiments of the present invention is illustrated in FIG. 1A. System 110 comprises an additive manufacturing apparatus 114 having a dispensing unit 16, which comprises a plurality of dispensing heads. Each head preferably comprises an array of one or more nozzles 122 in fluid connection with one or more channels, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation, and heads 16c and 16d can both dispense support material formulation. In an alternative embodiment, heads 16c and 16d, for example, may be combined in a single head having two nozzle arrays for depositing support material formulation. In some other embodiments, heads 16a and 16b are combined into a single dual channel print head that dispenses two distinct modeling material formulations, and heads 16c and 16d are combined into a single dual channel print head that dispenses one or more support material formulations.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

It is known to the skilled artisan that the type of dispensing heads (e.g. single channel or multiple channel) and the number of dispensing heads used in an AM system as described above may be adapted according to several considerations such as (1) the number and the nature of the building material formulations used in the AM system; (2) the printing resolution requirement for each one of the formulations; and (3) the overall printing speed to be achieved.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

The dispensing head and radiation source are preferably mounted in a frame or block 128 which is preferably operative to reciprocally move over a tray 360, which serves as the working surface. In some embodiments of the present invention, the radiation sources are mounted in the block such that they follow in the wake of the dispensing heads to at least partially cure or solidify the material formulations just dispensed by the dispensing heads. Tray 360 is positioned horizontally. According to the common conventions, an X-Y-Z Cartesian coordinate system is selected such that the X-Y plane is parallel to tray 360. Tray 360 is preferably configured to move vertically (along the Z direction, also referred to as the built direction), typically downward. In various exemplary embodiments of the invention, apparatus 114 further comprises one or more leveling devices 132, e.g. a roller 326. Leveling device 326 serves to straighten level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages (or passes) of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330, which comprises the building material formulation containers or cartridges and supplies a plurality of building material formulations to fabrication apparatus 114.

Figure 1B:
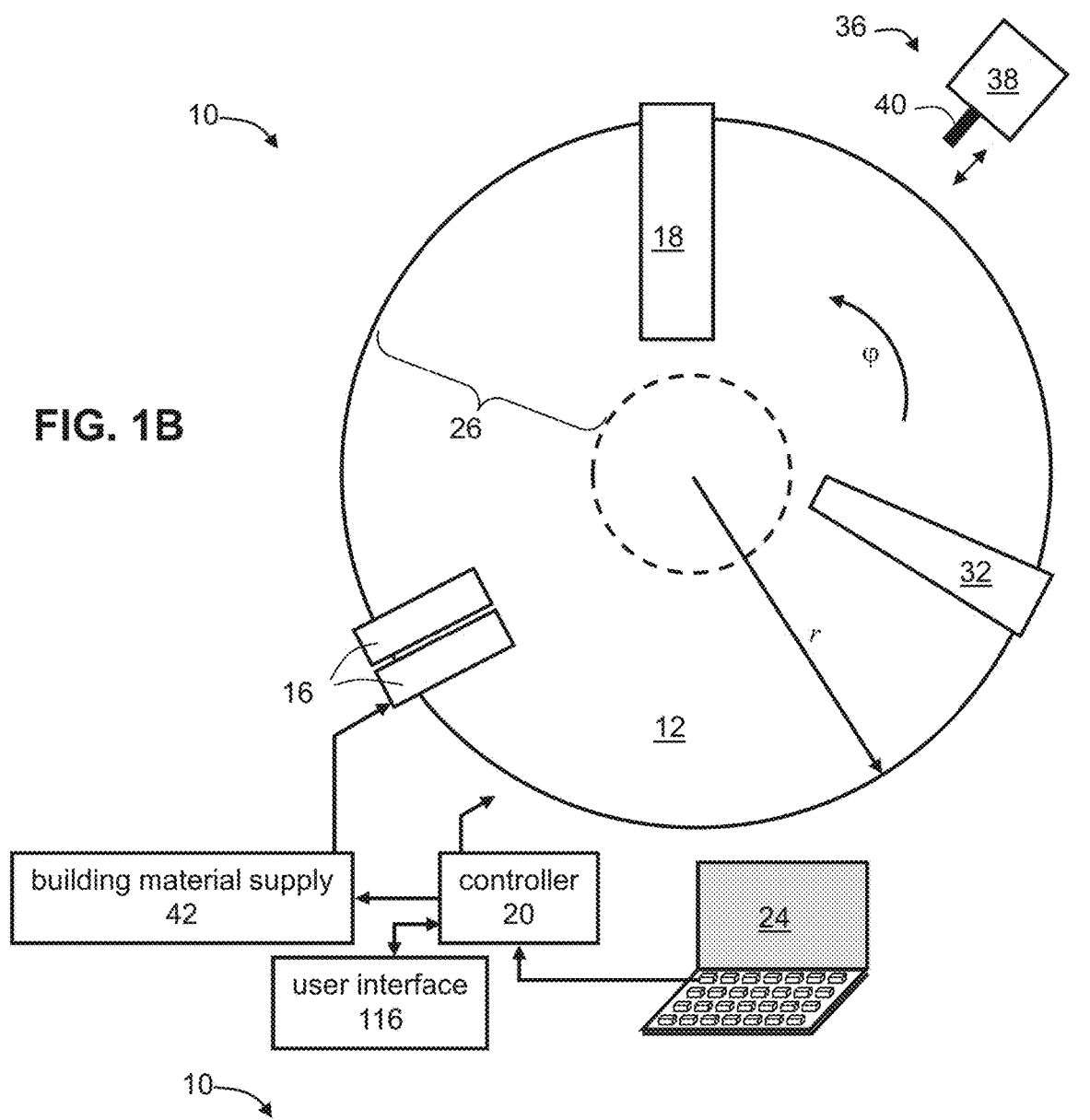
Figure 1C:
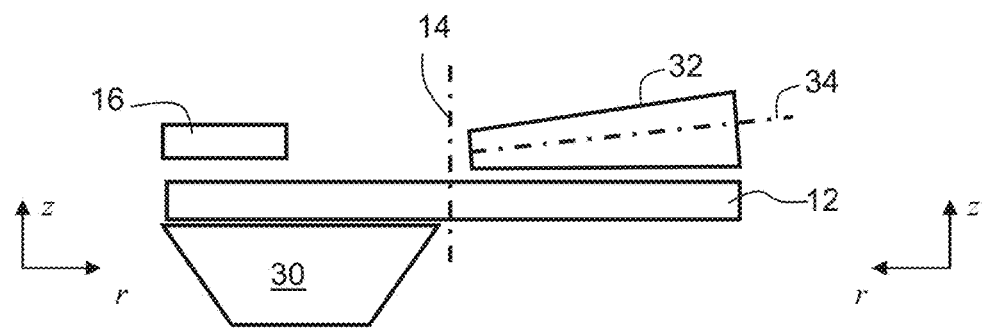
Figure 1D:
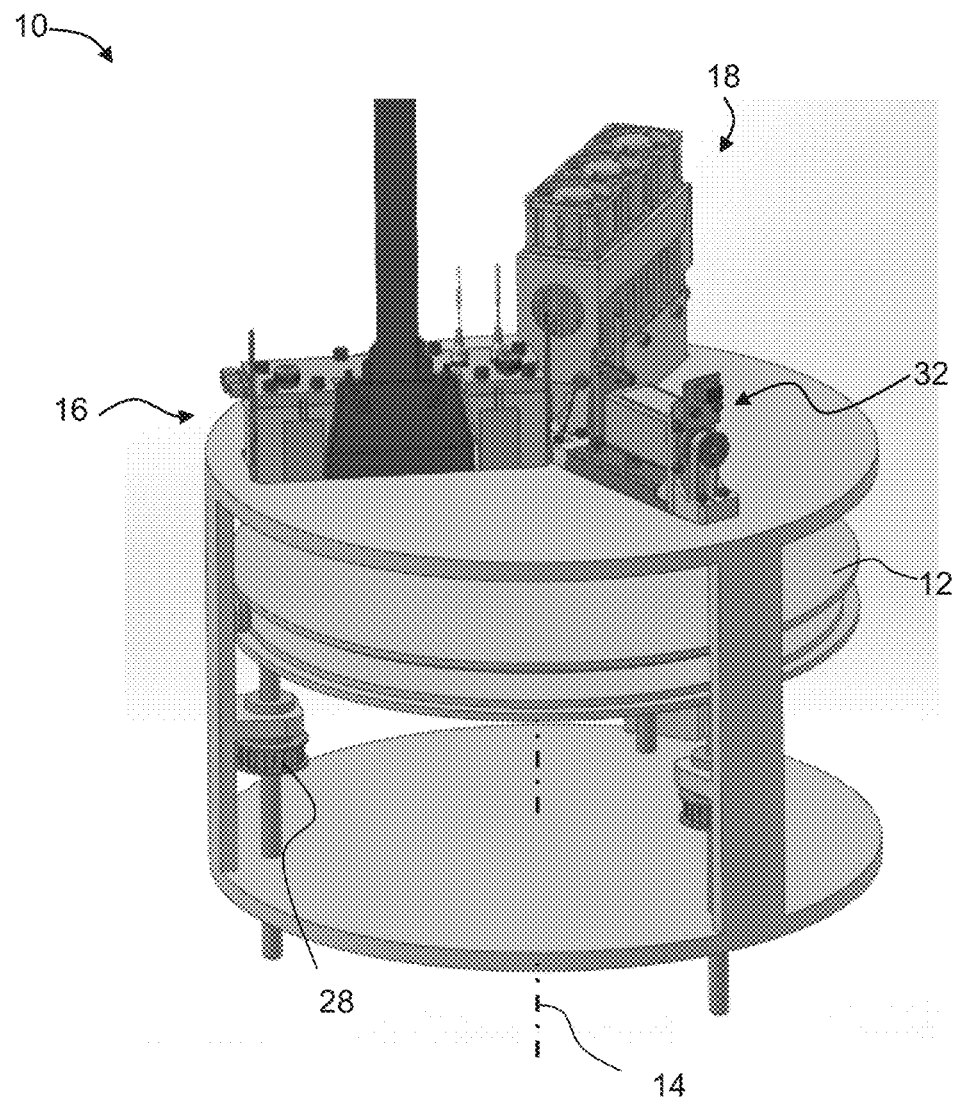

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head, which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1 - \varphi_2$, and the angle between the linear nozzle arrays of the two heads is also $\varphi_1 - \varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2 = (R-h)/h$ and wherein R is the farthest distance of the roller from axis 14 (for example, R can be the radius of tray 12).

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Any of systems 10 and 110 may optionally and preferably comprise a solidifying device 18 which can include any device configured to emit light, heat or the like that may cause the deposited material formulation to hardened. For example, solidifying device 18 can comprise one or more radiation sources, which can be, for example, an ultraviolet or visible or infrared lamp, or other sources of electromagnetic radiation, or electron beam source, depending on the modeling material formulation being used. The radiation source can include any type of radiation emitting device, including, without limitation, light emitting diode (LED), digital light processing (DLP) system, resistive lamp and the like. In some embodiments of the present invention, solidifying device 18 serves for curing or solidifying the modeling material formulation.

In any of systems 10 and 110, the operation of the inkjet printing heads and optionally and preferably also of one or more other components of the system, e.g., the motion of the tray, the operation of the supply system, the activation, deactivation, applied voltage, and position along the vertical and/or horizontal direction of the leveling device and/or the solidifying device, etc. are controlled by a controller (shown at 20). The controller can have an electronic circuit and a non-volatile memory medium readable by the circuit, wherein the memory medium stores program instructions which, when read by the circuit, cause the circuit to perform control operations as further detailed below.

The controller preferably communicates with a data processor or host computer (shown at 24) which transmits digital data pertaining to fabrication instructions based on computer object data, e.g., a Computer-Aided Design (CAD) configuration represented on a computer readable medium in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, the controller controls the voltage applied to each dispensing head or nozzle array and the temperature of the building material formulation in the respective printing head. Generally, controller 20 controls printing heads to dispense, droplets of building material formulation in layers, such as to print a three-dimensional object. In system 10, controller 20 optionally and preferably controls the printing heads to dispense the droplets while the tray is rotating.

In some embodiments, the controller receives additional input from the operator, e.g., using data processor 24 or using a user interface 116 communicating with the controller. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

The object data formats are typically structured according to a Cartesian system of coordinates. In these cases, when system 10 is employed, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In system 10, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application Nos. 20100191360 and 20170173886, the contents of which are hereby incorporated by reference.

FIG. 4 is a flowchart diagram of a method suitable for additive manufacturing of a three-dimensional object, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

One or more of the operations described below can be performed by an AM system, such as, but not limited to, system 10 or system 110, wherein the controller 20 is optionally and preferably configured to transmit control signals as further detailed hereinabove so as to the execute the respective operation.

Computer programs implementing the method can commonly be distributed to users on a distribution medium such as, but not limited to, a flash memory, CD-ROM, or a remote medium communicating with a local computer over the internet. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method. All these operations are well-known to those skilled in the art of computer systems.

The method can be embodied in many forms. For example, it can be embodied in on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium.

The method begins at 400 and optionally and preferably continues to 401 at which computer object data that collectively pertain to a three-dimensional shape of the object, and optionally also to a sacrificial structure, are received. The data can be received by a data processor (e.g., processor 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. For example, the data processor can receive the computer object data that correspond to the object to be manufactured, and generate the computer object data that correspond to the sacrificial structure.

The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method optionally and preferably continues to 402 at which one or more layers are sequentially dispensed and solidified to form a sacrificial structure.

The term "sacrificial structure" refers to a structure that is not part of the three-dimensional object to be fabricated, that is external to the three-dimensional object to be fabricated, and that is separated from the three-dimensional object, once fabricated, in order to be discarded or recycled.

The sacrificial structure is optionally and preferably formed directly on the tray of the AM system. Alternatively, it can be formed on a temporary receiving substrate placed on the tray.

In various exemplary embodiments of the invention, at least a portion of the sacrificial structure is formed by dispensing, at each layer, support material and modeling material at interlaced locations. Different regions of the sacrificial structure may optionally and preferably have different ratios between the number of voxels that are occupied by support material and the number of voxels that are occupied by modeling material. In some embodiments of the present invention, in at least a portion of the sacrificial structure, the modeling material forms a patterned structure, referred to herein as "a grid structure" within the support material. That is to say, at least a portion of the sacrificial structure comprises a bulk of support material and a grid structure of a modelling material that is embedded in the bulk. The present embodiments contemplate any type of grid, including, without limitation, a quadrilateral (e.g., rectangular) grid, a triangular grid, a hexagonal grid, a pentagonal grid, a polar grid, and any combination thereof. Additionally or alternatively, the grid structure may be, without limitation, continuous or non-continuous, be homogenously, non-homogeneously, or randomly dispersed within the support material, and may be formed, in some embodiments, by patterns of lines (e.g. a net), dots, helicoidal forms, and any other geometrical shape.

The borders of the sacrificial structure can form any shape (e.g., a rectangular shape) and preferably encompass an area that is larger than the area of the bottom surface of the object to be manufactured.

At 403 the method preferably sequentially dispenses and solidifies layers of modeling material to form the three-dimensional object on a portion of the sacrificial structure. This is preferably achieved by dispensing, in each layer, modeling material in a configured pattern corresponding to the respective slice of the computer object data, and/or support material in a configured pattern corresponding to the shape of a building construction for supporting selected regions of the object (e.g., non-vertical or hanging regions).

In some embodiments of the present invention the method proceeds to 404 at which a wall of the sacrificial structure is formed side-by-side with a side wall of the three-dimensional object. Since the sacrificial structure and the object are manufactured in a layerwise manner, operation 404 is preferably executed by continuing the formation of the sacrificial structure during the formation of at least part of the three-dimensional object. Specifically, for those layers that include the side-by-side walls, the AM system dispense building material in a pattern that corresponds to a slice of the sacrificial structure's wall, and in a pattern that corresponds to a slice of the object's side wall.

Optionally and preferably, the method continues to 405 at which the formation of the sacrificial structure continued after the built of the three-dimensional object is completed so as to at least partially cover the three-dimensional object from above with a portion of sacrificial structure.

The method ends at 406.

FIGS. 5A through 9 are schematic illustrations of cross-sectional views of a sacrificial structure 500, as fabricated according to various exemplary embodiments of the invention. FIGS. 5A, 6A, 7A, 8A and 9 are vertical cross sections (parallel to the built direction z). FIGS. 5B-D, 6B, 7B and 8B are horizontal cross sections (perpendicular to the built direction z), each corresponding to a single layer. Also shows (FIGS. 5A, 5B, 6A, 7A, 8A and 9) is object 112, so as to illustrate the spatial relation between object 112 and sacrificial structure 500. In the illustrated embodiments, which are not to be considered as limiting, object 112 has a regular vertical cross-section, wherein all its side walls are parallel to the vertical direction, but it is to be understood that the present embodiments are suitable also for other shapes.

The embodiments illustrated in FIGS. 5A through 9 correspond to the optional embodiment in which operations 404 and 405 are executed, wherein walls 510 of the sacrificial structure 500 are side-by-side with the side walls 512 of the object, and wherein a portion 514 of the sacrificial structure 500 at least partially covers object 112 from above. Walls 510 may be used for insulating object 112 from the ambient atmosphere and maintaining a homogeneous temperature in the vicinity of object 112. However, this need not necessarily be the case, since, for some applications, one or both operations 404 and 405 is not executed in which case sacrificial structure 500 may be devoid of a wall that is side-by-side with the side walls of the object, and/or devoid of a portion that covers of partially covers the object from above. For example, in some embodiments of the present invention sacrificial structure 500 is below the object in its entirety. Typical width of wall 510, as measured perpendicularly to the built direction of the layers, is at least 1.6 mm.

Figure 5A:
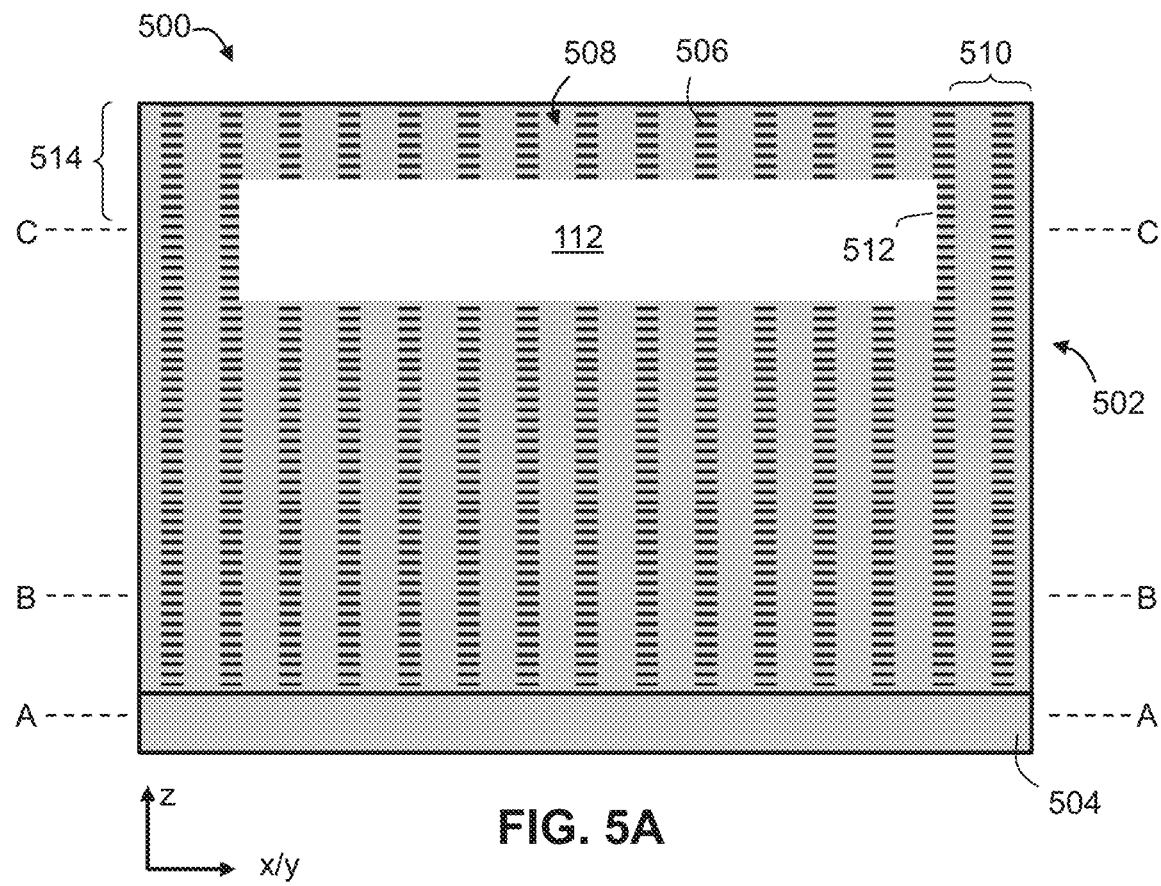
FIGS. 5A-D are schematic illustrations of an embodiment in which a sacrificial structure comprises a bulk volume that is formed of voxel elements containing a support material, and a modeling material at interlaced locations.

FIG. 5A illustrates an embodiment in which sacrificial structure 500 comprises a bulk volume 502 that is formed of voxel elements containing a support material, and a modeling material at predetermined locations. Optionally, sacrificial structure 500 also comprises a structure referred to as "a pedestal" and shown at 504. The pedestal 504 is optionally and preferably formed directly on the tray of the AM system. Alternatively, it can be formed on a temporary receiving substrate placed on the tray. Preferably, all other parts of sacrificial structure 500 (including, e.g., bulk volume 502) are formed over pedestal 504.

The pedestal can have a thickness of, from about 1 mm to about 7 mm. For example, when the AM system dispenses building material to form layers of, e.g., from about 20 μm to about 30 μm, the pedestal is formed by dispensing building material to form from about 100 to about 1000 consecutive layers directly on the tray temporary receiving substrate.

Figure 5B:
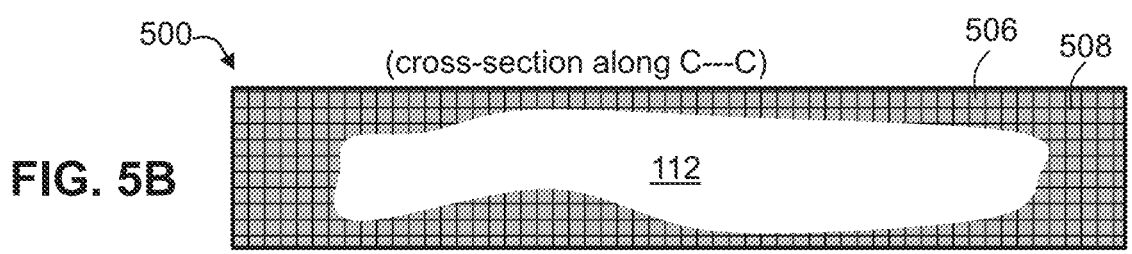
Figure 5C:
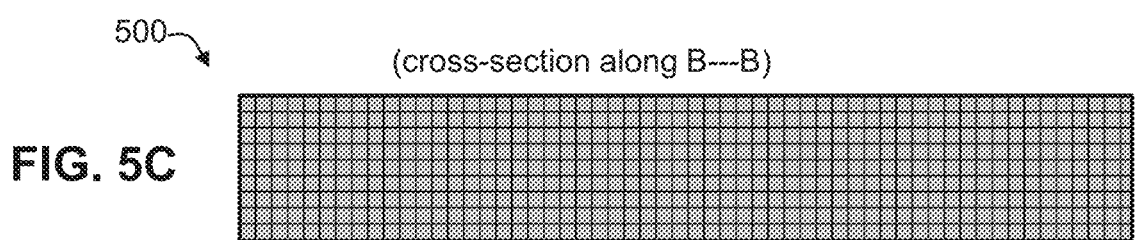
Figure 5D:
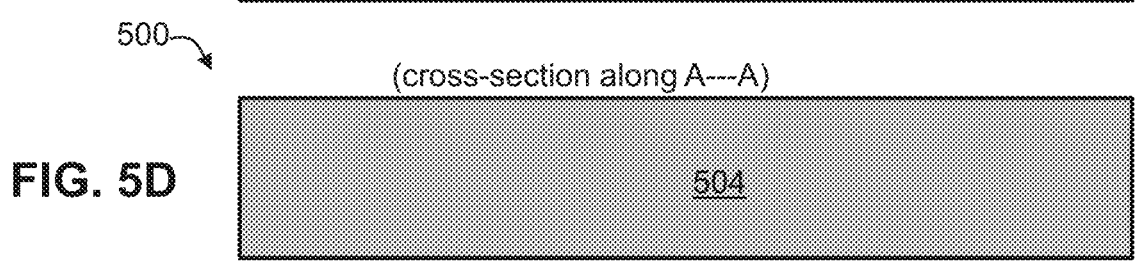

FIGS. 5B, 5C and 5D are horizontal cross-sectional views along the lines C—C, B—B and A—A, respectively, according to some embodiments of the present invention. In the embodiment illustrated in FIGS. 5B and 5C the modeling material in bulk 502 forms a grid structure 506 within the support material 508 as further detailed hereinabove. In the embodiment illustrated in FIGS. 5D the pedestal 504 is devoid of a grid structure, but in some embodiments of the present invention it is preferred to have a grid structure also in the pedestal. Pedestal 504 can be made of support material or a combination of support material and modeling material, preferably at interlaced locations that either form a grid structure or any other pattern, e.g., a random pattern.

In some embodiments of the present invention bulk volume 502 comprises the support material and more than one type of modeling material, for example, a first modeling material and a second, different, modeling material, wherein at least one voxel element contains the first modeling material, and at least one voxel element contains the second modeling material. In these embodiments, the different modeling materials are characterized by different heat deflection temperatures, once hardened.

As used herein, the term "heat distortion temperature" (HDT) refers to a temperature at which the respective material or combination of materials deforms under a predetermined load at some certain temperature. Suitable test procedures for determining the HDT of a material or combination of materials are the ASTM D-648 series, particularly the ASTM D-648-06 and ASTM D-648-07 methods.

It is recognized that the extent of curling correlates with the existence of a temperature gradient in the manufactured object along the vertical direction, and also with the difference between the characteristic HDT of the building material and the temperature within the AM system during fabrication. Without wishing to be bound to any theory, it is postulated that materials that develop during curing HDT which is close to the temperature within the system during fabrication can undergo stress relaxation or plastic deformation during the AM process, more easily than materials with similar shrinkage but which develop higher HDT.

The first and second modeling materials that are used for fabricating the sacrificial structure are optionally and preferably selected such that once they are hardened or solidified, the first modeling material is more rigid than the second modeling material, and the second material is more flexible than the first material. Preferably, the second modeling material is more exothermic during hardening than the first modeling material.

In some embodiments of the present invention the first material has a relatively high HDT (e.g., at least 50° C. or at least 60° C. or at least 70° C., or at least 80° C., or at least 90° C., or at least 100° C., or at least 110° C., or at least 120° C., or at least 130° C., or at least 140° C., or at least 150° C., once hardened or solidified, including any intermediate values, and including any subranges between these values), and the second material has a relatively low HDT (e.g., less than 50° C. or less than 40° C. or less than 30° C., or less than 20° C., once hardened or solidified, including any intermediate values, and including any subranges between these values). In these embodiments, the first modeling material is responsible for reinforcing the sacrificial structure and the second modeling material is responsible for reducing or eliminating the curling effect.

A ratio between a number of voxels containing the first modeling material and a number of voxels containing the support material can be from about 1:1 to about 99:1, or from about 1:10 to about 1:2, e.g., from about 1:5 to about 1:4.

A ratio between a number of voxels containing the second modeling material and a number of voxels containing the support material can be from about 1:1 to about 99:1, or from about 1:10 to about 1:1, e.g., from about 1:2 to about 1:1.

Formulations suitable for use as the first and second modeling materials are provided in the Examples section that follows (see Example 2).

Each of the first and second modeling materials is optionally and preferably dispensed at a different region of sacrificial structure 500, preferably, but not necessarily, to form a grid structure in that region. A representative example of this embodiment is illustrated in FIG. 6A. In the illustrated embodiment, sacrificial structure 500 comprises a lower part 518 having voxel elements containing the support material and voxel elements containing the first modeling material at interlaced locations, and also comprises an upper part 520 having voxel elements containing the support material and voxel elements containing the second modeling material at interlaced locations. FIGS. 6B and 6C are horizontal cross-sectional view along the lines C—C and D—D respectively, corresponding to a single layer according to some embodiments of the present invention. Horizontal cross-sectional views along the lines B—B and A—A of FIG. 6A are illustrated in FIGS. 5C and 5D, respectively. As shown in FIG. 5C and the enlarged view between FIGS. 6B and 6C, each of the first and the second modeling materials forms a grid structure 506 within support material 508 as further detailed hereinabove.

In some embodiments of the present invention, the grid structure is different among lower part 518 and upper part 520 of bulk volume 502. For example, the grid structures can be different in their densities. It is appreciated that higher grid density corresponds to higher ratio between the number of voxels that are occupied by the respective modeling material and the number of voxels that are occupied by the support material in the respective part of the bulk volume. Typically, but not necessarily, the grid structure in upper part 520 (FIG. 6C) is denser than the grid structure in lower part 518 (FIG. 5C), meaning that the ratio between the number of voxels that are occupied by the second modeling material and the number of voxels that are occupied by the support material in the upper part is higher than ratio between the number of voxels that are occupied by the first modeling material and the number of voxels that are occupied by the support material in the lower part.

The present embodiments also contemplate configurations in which the grid structure in parts 518 and 520 is of the same density, except that the grid structure in part 518 is formed from the first modeling material, and the grid structure in part 520 is formed from the second modeling material. Further contemplated are embodiments in which the grid structure in parts 518 and 520 are formed of the same modeling material (e.g., both formed of the first modeling material or both formed of the second modeling material) except that they are different in geometry (e.g., different density, for example, the grid structure in the upper part can be denser than the grid structure in the lower part).

In FIGS. 5A, 6A, 7A, 8A, 8C and 9, the upper region of the sacrificial structure is shown as surrounding the object being built. This is useful when it is desired to build an object with a consistent matte surface finish, as the surrounding sacrificial materials will provide an even matte surface finish to the object. An object made of a low HDT material, e.g. below 60° C., typically does not require a full surrounding sacrificial structure as illustrated. Instead, the bulk sacrificial structure, including lower and upper regions, may be printed up to the bottom of the first (lowest) layer of the object, and thereafter a thin sacrificial material about 1.6 mm in thickness may be built around the surface of the object to provide an even matte object surface finish. When it is desired to build an object with a glossy surface finish, the bulk sacrificial structure, including lower and upper regions, may be printed up to the bottom of the first (lowest) layer of the object, and thereafter no further surrounding sacrificial structure needs to be provide around and/or on top of the object being printed, depending on the object geometry not requiring support structures for overhangs or voids.

Figure 7A:
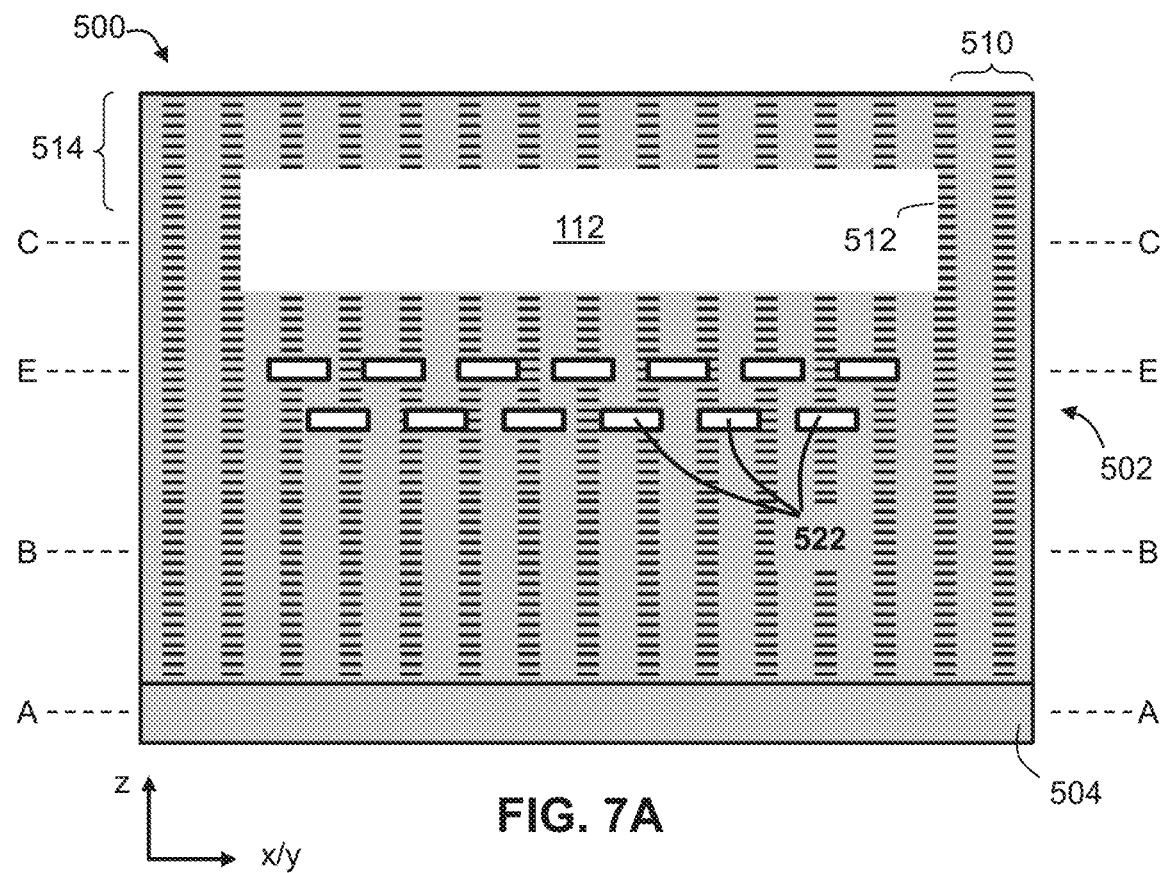
FIGS. 7A and 7B are schematic illustration of an embodiment in which heating cells are embedded in bulk volume of a sacrificial structure.
Figure 7B:
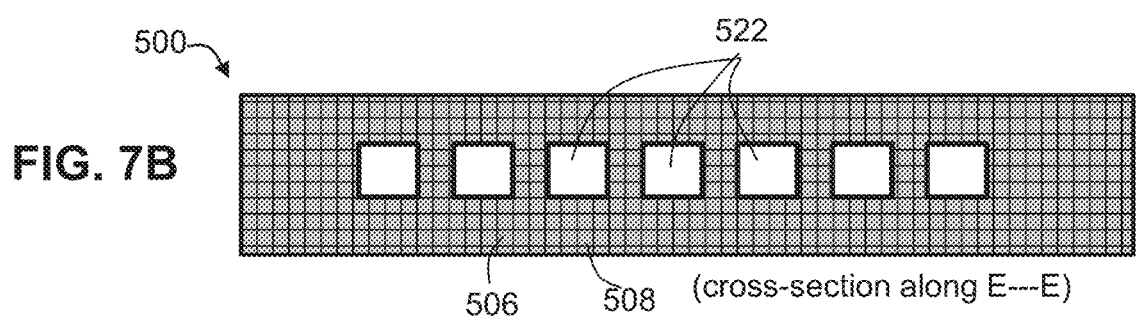

FIGS. 7A and 7B are schematic illustration in which heating cells 522 are embedded in bulk volume 502 of sacrificial structure 500. FIG. 7B is a horizontal cross section along the line E—E corresponding to a single layer. Horizontal cross sectional views along the lines C—C, B—B and A—A of FIG. 7A are illustrated in FIGS. 5B, 5C and 5D, respectively. Heating cells 522 are exothermic cells that serve for heating object 112, so as to reduce temperature gradients at the vicinity of object 112 and optionally and preferably also to reduce the difference between the temperature nearby object 112 and the HDT of the modeling material used for manufacturing it. Since the upper part of object 112 typically receives heat during its additive manufacturing (e.g., by means of radiation emitted by solidifying device 18, see FIGS. 1A and 1B) and also generates heat due to the exothermic polymerization process, heating cells are typically distributed below object 112 as illustrated in FIG. 7A so that the difference of temperature between the bottom part and the upper part of object 112 is reduced.

Heating cells 522 can be embodied as islands that comprise modeling material and that are embedded within the bulk 502. The modeling material in heating cells 522 is preferably exothermically polymerizable. Suitable modeling materials for heating cells 522 can be any of the modeling materials marketed by Stratasys Ltd., Israel, such as, but not limited to, the Vero™ Family of materials, the Tango™ Family of materials and the like. Also contemplated are heating cells that comprise the first and/or second modeling materials described herein, more preferably the second modeling material described herein. In some embodiments of the present invention heating cells 522 are made of the second modeling material, and are devoid of the support material, and preferably also devoid of the first modeling material.

During the solidification process of each dispensed layer containing a slice of one or more heating cells (e.g., the layer illustrated in FIG. 7B), the modeling material in the heating cells 522 begins to polymerize, and to release heat. Preferably, the modeling material in heating cells 522 and the building material or materials that are in the bulk volume 502 but not in heating cells 522 are selected such that the modeling material in heating cells 522 releases more heat than the bulk volume 502 upon the solidification of the layer. This can be ensured, for example, by including more modeling material in heating cells 522 than outside them. For example, heating cells 522 can be made of about 100% modeling material, and bulk volume 502 can include a substantial amount (e.g., at least 40%) of support material than is less exothermic upon solidification (e.g., polymerization) than the modeling material in heating cells 522.

Heating cells 522 can be of any shape and size, and can be distributed within bulk volume 502 at any distribution. Typically, the vertical distance between at least one of heating cells 522 and the tray of the AM system is from about 0.02 mm to about 0.2 mm. Preferred dimensions of each heating cell are $X_h$ mm in length $Y_h$ mm in width and $Z_h$ mm in height, where each of $X_h$ and $Y_h$ is from about 1 mm to about 20 mm, and $Z_h$ is from about 0.06 mm to about 1 mm.

Figure 8A:
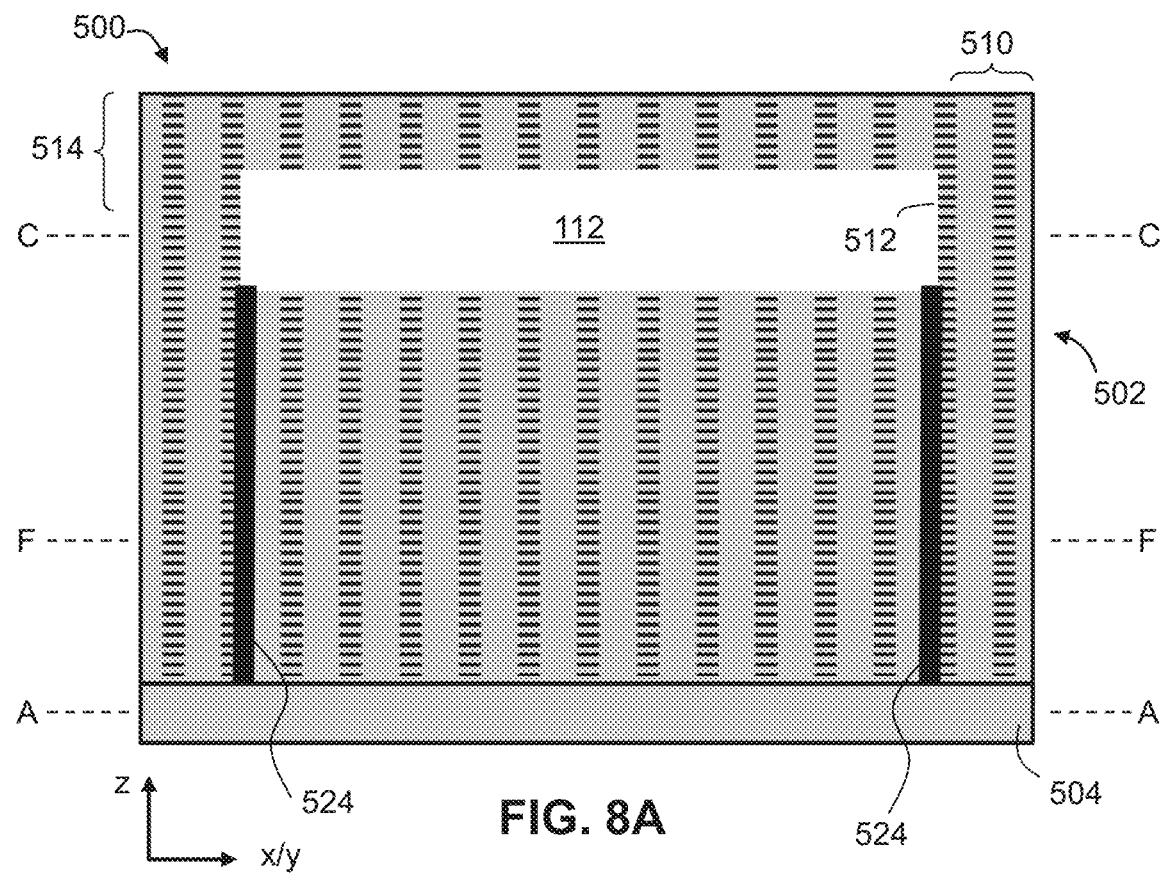
FIGS. 8A-C are schematic illustrations of embodiments in which a sacrificial structure comprises pinning structures.
Figure 8B:
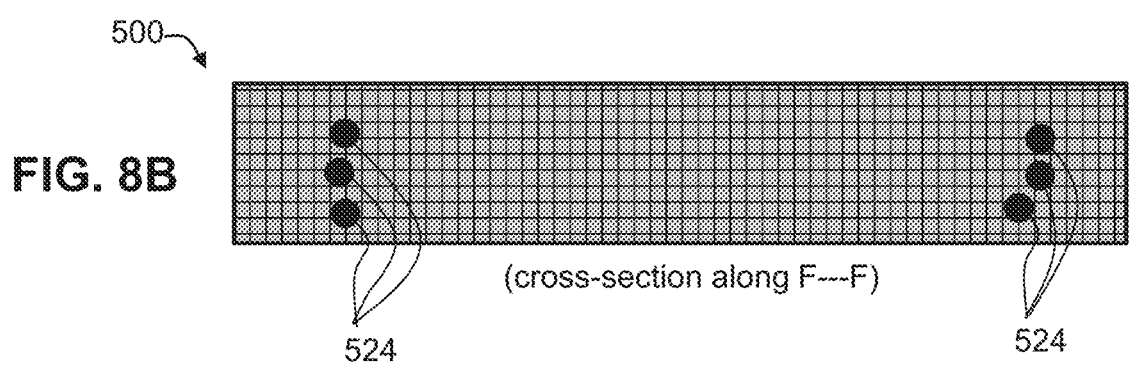
Figure 8C:
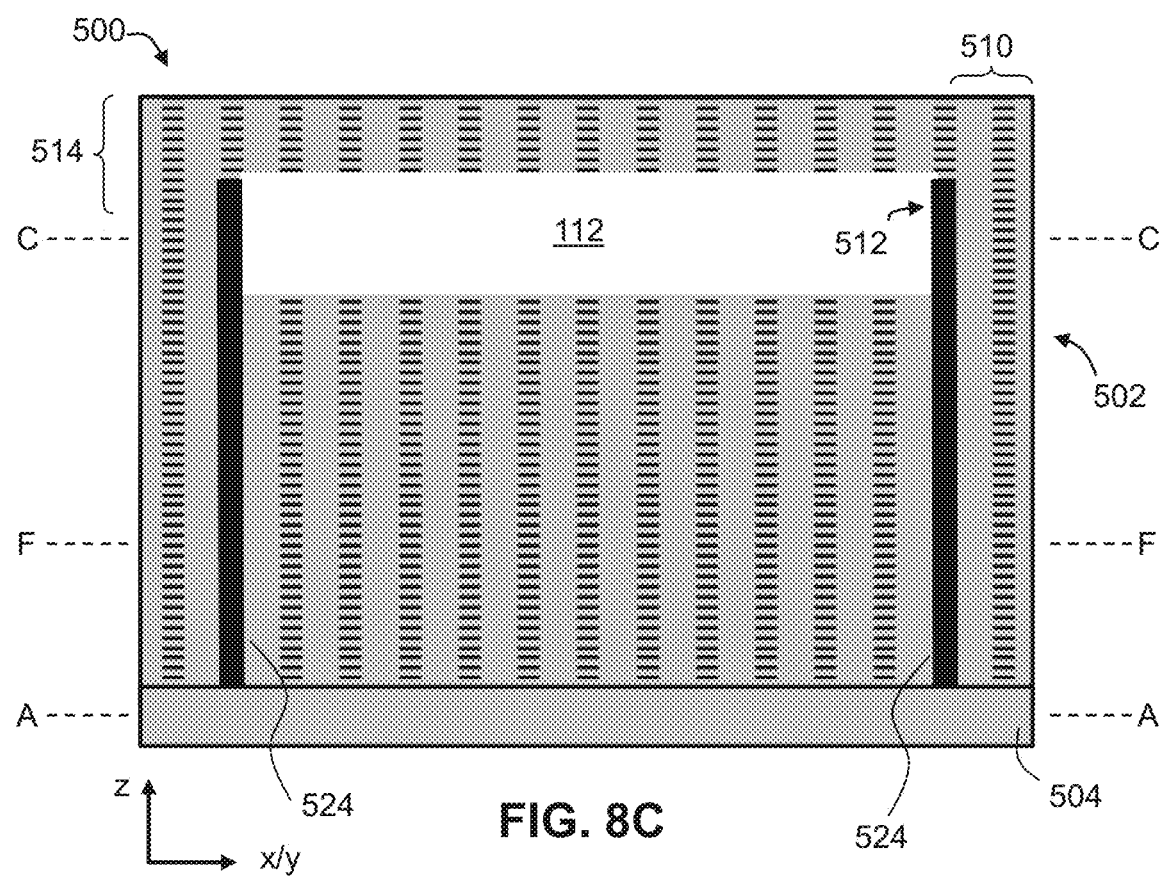

FIGS. 8A-C are schematic illustration in which pinning structures 524 are embedded in bulk volume 502 of sacrificial structure 500. FIG. 8B is a horizontal cross section along the line F—F corresponding to a single layer. Horizontal cross sectional views along the lines C—C and A—A, of FIGS. 8A and 8C are illustrated in FIGS. 5B and 5D, respectively. In some embodiments of the present invention pinning structures 524 are made of a building material that, once solidified, is more rigid than bulk volume 502. For example, pinning structures 524 can be made of a modeling material, such as, but not limited to, the first modeling material described herein. The pinning structures 524 serve for better anchoring of the object 112, more preferably its periphery, to the tray or receiving surface or the pedestal 504 (when employed), hence to reduce the likelihood of curling. The pinning structures 524 preferably support the object 112 from below. Yet, in some embodiments of the present invention pinning structures 524 extend further along the z direction to support the side wall 512 of object 112. This embodiment is illustrated in FIG. 8C.

Pinning structures 524 can have any shape. In the embodiment illustrated in FIGS. 8A and 8B, pinning structures 524 are shaped as poles, with a round (e.g., circular) cross-section (see FIG. 8B), but shapes other than poles (e.g., isolated walls), and poles with other cross-sections (e.g., rectangular, hexagonal, etc.) are also contemplated according to some embodiments of the present invention.

When pinning structures 524 are shaped as poles, the number and distribution of the poles along the periphery of object 112 typically depends on the shape of the object, and particularly on its horizontal cross section. Generally, when there is a higher likelihood for curling, it is preferred to have a larger number of poles. When the horizontal cross section is elongated (e.g., having a length to width or width to length aspect ratio of at least 1.5), it is sufficient to have the poles distributed along the shorter sides of its bottommost layer, as illustrated in FIG. 8B, because for high aspect ratio objects, lifting typically occurs at the shorter sides. When the horizontal cross section has a length to width aspect ratio that is close to 1 (e.g., from 0.5 to about 1.5), the poles can be distributed also along the entire periphery of the bottommost layer of the object. Typical radius of each pinning structure is from about 0.8 mm to about 3 mm, and a typical separation between adjacent pinning structures is from about 50 mm to about 500 mm.

Figure 9:
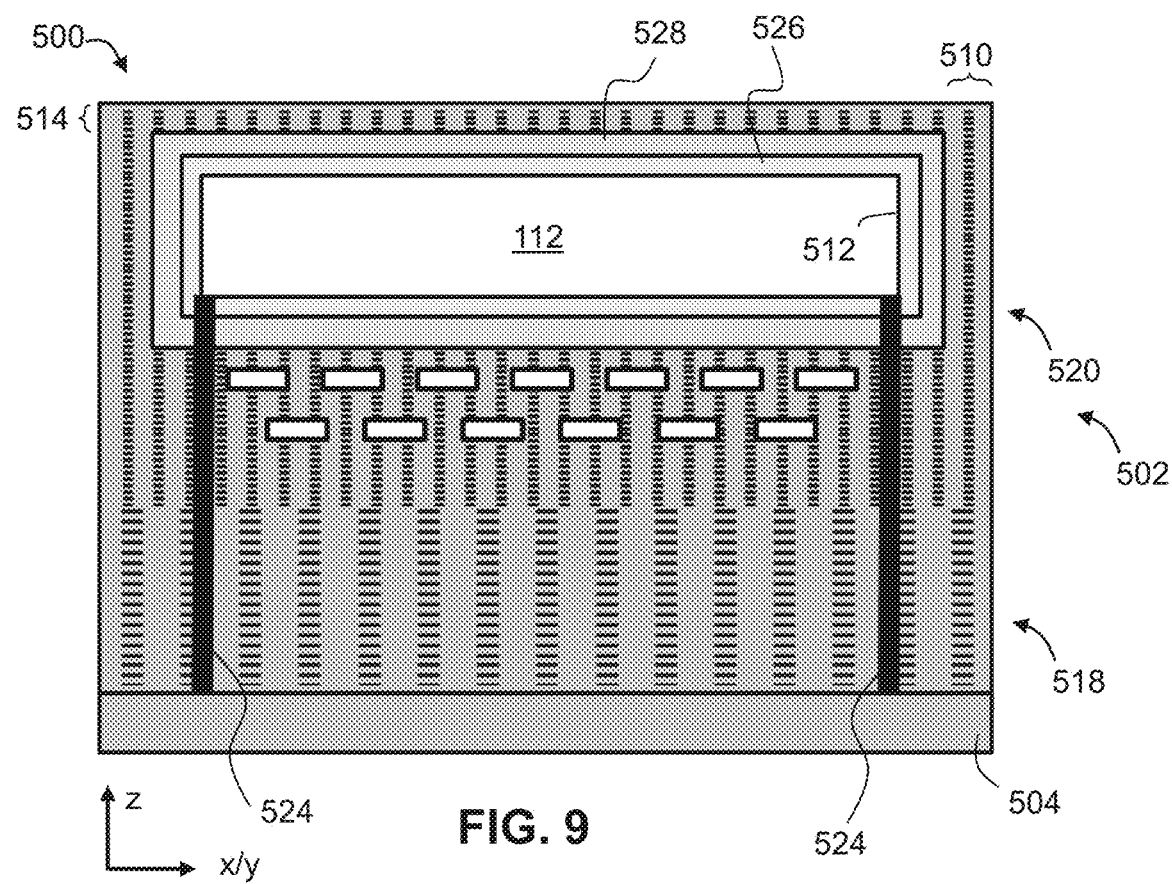
FIG. 9 is a schematic illustrations of an embodiment in which a sacrificial structure comprises a combination of the embodiments illustrated in FIGS. 5A, 6A, 7A and 8A.

While each of the embodiments described above can separately reduce the extent of the curling effect, the inventor of the present invention found that combination of two or more, and more preferably three or more, even more preferably all the above embodiments can synergistically combine the advantages of each of these embodiments separately. A preferred embodiment which is a combination of at least the embodiments illustrated in FIGS. 5A, 6A, 7A and 8A is schematically illustrated in FIG. 9. In this embodiment, sacrificial structure 500 comprises pedestal 504, bulk volume 502, wherein pinning structures 524 are embedded in bulk volume 502 (optionally and preferably shaped a poles) and heating cells 522. In addition, bulk volume 502 is fabricated with lower part 518 and upper part 520, each having voxel elements containing the support material and voxel elements containing modeling material at interlaced locations, wherein the modeling material in lower part 518 is the first modeling material described herein, but not the second modeling material described herein, and wherein the modeling material in upper part 520 is the second modeling material described herein, but not the first modeling material described herein. Heating cells 522 are optionally and preferably embedded in upper part 520 but below object 112.

In any of the embodiments described herein, e.g., any of the embodiments illustrated in FIGS. 5A, 6A, 7A, 8A, 8C and 9, a gap 526 that is devoid of any building material optionally and preferably surrounds object 112. Gap 526 serves for easy separation of object 112 from its surrounding structure, as well as improvement of surface quality of the final object due to reduction of overlapping or intermixing of adjacent drops within the same layer. Nearby voxels of the same plane spread to fill gap 526, thereby preventing the layers above the gap from collapsing or dripping into the gap. The width of gap 526 is typically from about 10 µm to about 100 µm, e.g., from about 70 µm to about 90 µm. In experiments performed by the inventors, a gap width of about 84 µm, has been successfully employed. Optionally, a fine structure 528 surrounds gap 526 and further separates between sacrificial structure 500 and object 112. Fine structure 528 is typically formed of support material and is devoid of any modeling material. Fine structure 528 is typically about 100 µm or less in thickness. Fine structure 528 may additionally comprise an outline of fine grid a few hundred microns, comprising a ratio of about 1:10 modeling material to support material.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Curling Measurements

Experiments were performed to investigate the effect of the several features of the sacrificial structure on the curling. The investigated features were (i) sacrificial structure's walls 510, 15 mm in width, side-by-side with the side wall of the three-dimensional object; (ii) sacrificial structure's walls 510, 7 mm in width, side-by-side with the side wall of the three-dimensional object; (iii) bulk 502 with the first modeling material forming a grid structure within the support material; (iv) bulk 502 with lower part 518 and upper part 520, both fabricated with a modeling material forming a grid structure within the support material, wherein the grid structure in upper part 520 is denser than the grid structure in lower part 518, and wherein the grid structure in upper part 520 is made of the second modeling material and the grid structure in lower part 518 is made of the first modeling material; (v) heating cells 522.

The experiments were conducted using a J750 and a CONNEX-500 3D inkjet printing system, both by Stratasys, Ltd., Israel.

The experiments were conducted for a 230×10×10 mm bar which has a surrounding structure of wall thickness of about 1.6 mm in some experiments. The bar was printed on a 5 mm sacrificial structure, or on a structure, 40 mm in thickness, made a sacrificial structure typically at about a 1:3 ratio of modeling to support material.

The results are summarized in tables 1.1 and 1.2. The numbers define the curling extend measured at the periphery of the printed object. Empty entries in the table correspond to experiment not completed.

TABLE 1.1

| Sacrificial structure feature No. | Bar on 5 mm pedestal | Bar on 40 mm support | Surrounding Structure |
|---|---|---|---|
| Reference: No sacrificial structure | 4.5 mm | 13 mm | Maximum 2.03 mm range 2.33 mm |
| Feature (i) | 0 mm | 1.3 mm | Maximum 0.9 mm range 1.3 mm |
| Features (i) + (iii) | 0 mm | 2.3 mm | |
| Feature (ii) | | | Maximum 2.14 mm range 2.83 mm |
| Feature (iii) | 2.5 mm | 9.1 mm | Maximum 0.85 mm range 0.9 mm |
| Feature (iv) | | 6.5 mm | |
| Feature (v) | 2 mm | 2 mm | Maximum 0.45 mm range 0.7 mm |

TABLE 1.2

| Sample/Conditions | Curling, mm (after 24 + hrs) |
|---|---|
| Reference (1.0 mm thick standard pedestal) | 10; 13 |
| Surrounding structure 5 mm | 5; 5 |
| 4 layers heating cells (10 × 10 × 0.5 mm), total 2.3 mm thick. | 6; 6 |
| Reference (2.3 mm thick standard pedestal) | 9; 9 |
| 6 layers heating cells (10 × 10 × 0.5 mm)), total 3.5 mm thick | 5; 6 |
| 12 layers heating cells (10 × 10 × 0.5 mm)), total 7.1 mm thick | 3; 4 |

In Table 1.2, two samples were printed for each experiment. The rightmost column in this table provides measurements for each of the two printed samples.

Figure 10A:
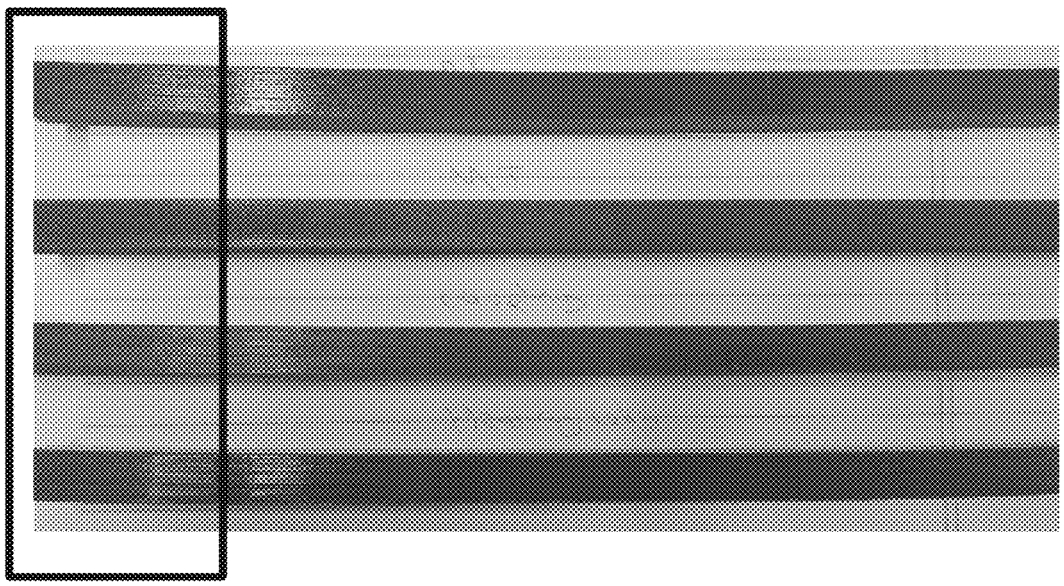
FIGS. 10A and 10B are images of printed objects obtained in experiments performed according to some embodiments of the present invention.
Figure 10B:
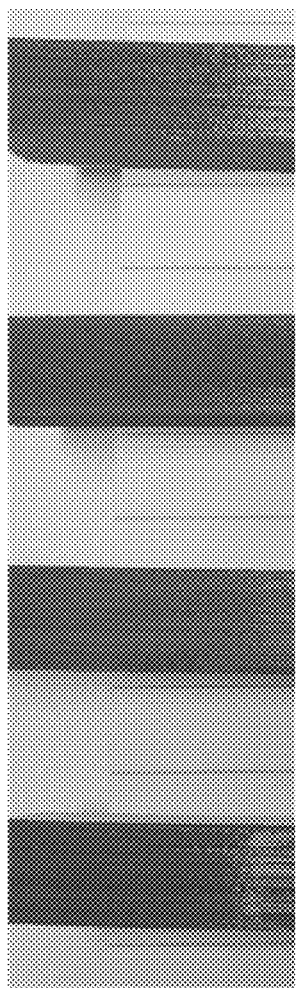

Representative images of the results of the bar experiments are provided in FIGS. 10A and 10B, where FIG. 10B is a magnified view of the marked section in FIG. 10A. Shown are, from top to bottom: the results corresponding to no sacrificial structure, feature (i), feature (iii) and feature (v).

This example demonstrates the ability of the sacrificial structure to reduce curling for both elongated objects (e.g., bar) and objects having a horizontal aspect ratio close to 1.

Example 2

Exemplary Modeling Material Formulations

Representative examples of modeling materials suitable for manufacturing the object 112 according to some embodiments of the present invention include, without limitation, modeling materials marketed by Stratasys, Israel, e.g., Vero™ family and D-ABS. Representative examples of support materials suitable according to some embodiments of the present invention include, without limitation, support materials marketed by Stratasys, Israel, e.g., sup705 and sup706.

Representative examples of modeling materials that can be used as the first modeling material include, without limitation, RGD515 and RGD517 marketed by Stratasys, Israel.

Representative examples of modeling materials that can be used as the second modeling material include, without limitation, RGD535, RGD537 marketed by Stratasys, Israel.

The following formulations present exemplary formulations successfully practiced in AM of layered objects featuring a layered structure as described herein in any of the respective embodiments.

Each of Tables 2-5 below present exemplary materials suitable for inclusion in a formulation for dispensing to form the first modeling material, according to some embodiments of the present invention.

TABLE 2

| Component | Exemplary Materials | Percentage (%) |
|---|---|---|
| Curable acrylic monomer, characterized, when hardened, by Tg > 85° C. | ACMO (CAS: 5117-12-4) (Tg = 88° C.) IBOA (CAS: 5888-33-5) (Tg = 95° C.) SR 833S (CAS: 42594-17-2) (Tg = 185° C.) SR454 ethoxylated (3) TMPTA (CAS: 28961-43-5) (Tg = 103° C.) SR508 (CAS 57472-68-1) (Tg = 104° C.) SR368 (CAS: 40220-08-4) (Tg = 272° C.) | 10-40 |
| Curable Methacrylic monomer, characterized, when hardened, by Tg > 150° C. | SR 834 (CAS: 43048-08-4) SR-423D (CAS: 7534-94-3) | 35-50 |
| (Meth)acrylic Oilgomer, characterized, when hardened, by Tg > 50° C. | BR-441 (Di functional Aliphatic polyester urethane Acrylate) (Tg = 71° C.) PH 6019 (Trifunctional Aliphatic urethane acrylate) (Tg = 51° C.) Eb3703 amine modified epoxy Diacrylate (Tg = 57° C.) | 10-40 |
| (Meth) acrylic flexible monomer, Having low Tg < −20° C. | SR 9036 (Ethoxylated (30) bisphenol A dimethacrylate) (CAS: 41637-38-1) (Tg = −43° C.) | 5-30 |

TABLE 2-continued

| Component | Exemplary Materials | Percentage (%) |
|---|---|---|
| | SR415 (Ethoxylated (20) Trimethylol propane triacrylate) (CAS: 28961-43-5) (Tg = −40° C.) SR 9035 (Ethoxylated (15) Trimethylol propane triacrylate (Tg = −30° C.) | |
| Photoinitiator | BAPO type (Bis Acyl Phosphine Oxide) Alpha Hydroxy ketone MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |
| Inorganic Pigment | Nano scale Titanium Oxide Nano scale Zirconium Oxide Nano Silica | 0.1-0.3 |
| Organic pigment | Nano scale Carbon black | 0.1-0.15 |

TABLE 3

| Material | Wt. percentage (%) |
|---|---|
| Mono functional Acrylic monomer Tg > 85° C. | 10-30 |
| Methacrylic monomer, Tg > 150° C. | 5-20 |
| Polyester based Urethane Acrylate | 5-20 |
| (Meth)acrylic Oligomer, Tg > 50° C. | 10-20 |
| Acrylic multi-functional monomer Tg > 85° C. | 20-30 |
| Inhibitor | 0.1-0.3 |
| Photoinitiator | 0.5-3 |
| Surfactant | 0.01-1 |
| Epoxy Acrylate | 1-5 |
| Dispersing agent | 0.01-0.05 |
| Inorganic pigment nano scale | 0.2-0.6 |

TABLE 4

| Material | Wt. percentage (%) |
|---|---|
| Mono functional Acrylic monomer Tg > 85° C. | 10-30 |
| Multi functional Acrylic monomer Tg > 85° C. | 10-20 |
| SR 834 | >35% |
| (Meth)acrylic Oilgomer, Tg > 50° C. | 10-20 |
| (Meth)acrylic flexible monomer, Having low Tg < −20° C | 5-15 |
| Inhibitor | 0.1-0.3 |
| Photoinitiator | 2-5 |
| Surfactant | 0.01-1 |
| Dispersant | 0.01-1 |
| Organic pigment | 0.5-0.15 |

TABLE 5

| Material | Wt. percentage (%) |
|---|---|
| Mono functional Acrylic monomer Tg > 85° C. | 10-30 |
| Multi functional Acrylic monomer Tg > 85° C. | 10-30 |
| SR834 | <35% |
| Polyester Urethane Acrylate | 5-15 |
| (Meth)acrylic flexible monomer, Having low Tg < −20° C. | 10-30 |
| Inhibitor | 0.1-0.3 |
| Photoinitiator | 1-5 |
| Surfactant | 0.01-1 |
| Dispersant | 0.01-1 |
| Inorganic pigment | 0.5-1 |

Each of Tables 6 and 7 below presents exemplary materials suitable for inclusion in a formulation for dispensing to form the second modeling material, according to some embodiments of the present invention.

TABLE 6

| Material | Examples | Percentage (%) |
|---|---|---|
| Curable (meth) acrylic monomer, characterized, when hardened, by Tg > 85° C. | ACMO (CAS: 5117-12-4) (Tg = 88° C.) IBOA (CAS: 5888-33-5) (Tg = 95° C.) SR 833S (CAS: 42594-17-2) (Tg = 185° C.) SR454 ethoxylated (3) TMPTA (CAS 28961-43-5) (Tg = 103° C.) SR508 (CAS 57472-68-1) (Tg = 104° C.) SR368 (CAS 40220-08-4) (Tg = 272° C.) SR423 (CAS 7534-94-3) (Tg = 110° C.) | 10-50 |

TABLE 6-continued

| Material | Examples | Percentage (%) |
|---|---|---|
| Curable (meth) acrylic oligomer characterized, when hardened, by Tg > 10° C. | CN-991 (Aliphatic polyester based Urethane diacrylate) (Tg = 40° C.) PH 6019 Aliphatic Urethane TriAcrylate (Tg = 51° C.) Eb3708 (Modified bisphenol-A epoxy diacrylate) (Tg = 21° C.) | 10-50 |
| Curable ethoxylated trifunctional (meth) acrylic monomer, characterized, when hardened, by Tg < −20° C. | SR 9036 (Ethoxylated (30) bisphenol A dimethacrylate) (CAS 41637-38-1) (Tg = −43° C.) SR415 (Ethoxylated (20) Trimethylol propane triacrylate) (CAS 28961-43-5, Tg = −40° C.) SR 9035 (Ethoxylated (15) Trimethylol propane triacrylate) (Tg = −30° C.) *Other examples are shown in Table 6 below | 5-40 |
| Photoinitiator | BAPO type (Bis Acyl Phosphine Oxide) Alpha Hydroxy ketone MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |

TABLE 7

| Material | | MW (gram/mol) | Number of Ethoxylated groups | Viscosity (Cp at 25° C.) |
|---|---|---|---|---|
| SR-9036 | Ethoxylated (30) bisphenol A dimethacrylate | 2156 | 30 | 610 |
| SR-415 | Ethoxylated (20) Trimethylolpropane Triacrylate | 1176 | 20 | 225 |
| SR430 | Ethoxylated 18 Tristyrylphenol acrylate (RSP(18EO)A) | 1249 | 18 | 825 |
| SR9035 | Ethoxylated 15 Trimethylolpropane Triacrylate | 956 | 15 | 177 |
| SR567P | Ethoxylated 25 C22 methacrylate | 1494 | 25 | 250 |
| SR480 | Ethoxylated 10 bisphenol A DMA | 808 | 10 | 410 |
| SR499 | Ethoxylated (6) Trimethylolpropane Triacrylate | 554 | 6 | 92 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of additive manufacturing of a three-dimensional object, the method comprising:
   sequentially dispensing and solidifying layers to form on a surface a sacrificial structure comprising a bulk volume and heating cells embedded in said bulk volume, wherein said heating cells are made of a modeling material that releases more heat than said bulk volume upon said solidification of said layers; and
   sequentially dispensing and solidifying layers to form the three-dimensional object on a portion of said sacrificial structure;
   wherein at least one of said heating cells has dimensions of Xh mm in length, Yh mm in width, and Zh mm in height, wherein each of Xh and Yh is from about 1 mm to about 20 mm, and wherein Zh is from about 0.06 mm to about 1 mm.

2. The method of claim 1, wherein said sacrificial structure also comprises pinning structures embedded in said bulk volume, said pinning structures being made of a building material that, once solidified, is harder than said bulk volume.

3. The method of claim 2, wherein said pinning structures are shaped as poles.

4. The method according to claim 3, wherein said pinning structures are formed to support a periphery of the three-dimensional object from below.

5. The method according to claim 3, wherein said pinning structures are formed to support a side wall of the three-dimensional object.

6. The method according to claim 2, wherein said pinning structures are formed to support a periphery of the three-dimensional object from below.

7. The method according to claim 2, wherein said pinning structures are formed to support a side wall of the three-dimensional object.

8. The method according to claim 1, wherein said bulk volume comprises voxel elements containing a support material, and a modeling material at interlaced locations, wherein at least one voxel element contains a first modeling material having, immediately once solidified, a heat deflection temperature (HDT) of at least 50° C., and wherein at least one voxel element contains a second modeling material having, immediately once solidified, a HDT of less than 50° C.

9. The method according to claim 8, wherein said bulk volume comprises a lower part having voxel elements containing said support material and said first modeling material at interlaced locations, and also comprises an upper part having voxel elements containing said support material and said second modeling material at interlaced locations.

10. The method according to claim 9, wherein said heating cells are embedded in said upper part but below the three-dimensional object.

11. The method according to claim 10, wherein said heating cells are made at least in part of said second modeling material.

12. The method according to claim 9, wherein said heating cells are made at least in part of said second modeling material.

13. The method according to claim 12, wherein said heating cells are devoid of said support material.

14. The method according to claim 13, wherein said heating cells are devoid of said first modeling material.

15. The method according to claim 12, wherein said heating cells are devoid of said first modeling material.

16. The method according to claim 1, comprising continuing forming said sacrificial structure during said dispensing and solidifying of said layers to form the three-dimensional object, so as to form a wall of said sacrificial structure side-by-side with a side wall of the three-dimensional object.

17. The method according to claim 16, wherein a width of said wall of said sacrificial structure, as measured perpendicularly to a built direction of said layers, is at least 1.6 mm.

18. The method according to claim 1, comprising continuing forming said sacrificial structure following said dispensing and solidifying of said layers to form the three-dimensional object, so as to at least partially cover the three-dimensional object with said sacrificial structure from above.

19. The method according to claim 1, comprising continuing forming said sacrificial structure during said dispensing and solidifying of said layers to form the three-dimensional object, so as to form a wall of said sacrificial structure side-by-side with a side wall of the three-dimensional object, wherein said wall containing a support material and a modeling material at interlaced locations, said modeling material having a heat deflection temperature (HDT) of less than 50° C.

20. The method according to claim 19, comprising continuing forming said sacrificial structure following said dispensing and solidifying of said layers to form the three-dimensional object, so as to at least partially cover the three-dimensional object with said sacrificial structure from above.

* * * * *